US009002742B2

(12) United States Patent
Dumas et al.

(10) Patent No.: US 9,002,742 B2
(45) Date of Patent: Apr. 7, 2015

(54) COMPUTER IMPLEMENTED METHOD FOR A RECYCLING COMPANY TO INCREASE RECYCLING DEMAND

(71) Applicants: Elisah Dumas, San Carlos, CA (US); Elijah Dumas, San Carlos, CA (US)

(72) Inventors: Elisah Dumas, San Carlos, CA (US); Elijah Dumas, San Carlos, CA (US)

(*) Notice: Subject to any disclaimer, the term of this patent is extended or adjusted under 35 U.S.C. 154(b) by 21 days.

(21) Appl. No.: 13/829,530

(22) Filed: Mar. 14, 2013

(65) Prior Publication Data
US 2014/0279412 A1 Sep. 18, 2014

(51) Int. Cl.
G06Q 10/00 (2012.01)
G07F 7/06 (2006.01)
G06Q 30/02 (2012.01)
G06Q 30/06 (2012.01)

(52) U.S. Cl.
CPC *G06Q 10/30* (2013.01); *G07F 7/06* (2013.01); *G06Q 30/0279* (2013.01); *G06Q 30/0237* (2013.01); *G06Q 30/0601* (2013.01); *G06Q 30/0278* (2013.01)

(58) Field of Classification Search
CPC .............. G06Q 10/30; G06Q 30/0278; G06Q 30/0601; G06Q 30/0237; G06Q 30/0279; G07F 7/06
See application file for complete search history.

(56) References Cited

U.S. PATENT DOCUMENTS

| 4,176,054 | A | * | 11/1979 | Kelley | ............................... 209/8 |
| 4,608,485 | A | | 8/1986 | Miura | |
| 4,641,239 | A | | 2/1987 | Takesako | |
| 5,042,634 | A | * | 8/1991 | Gulmini | ....................... 194/209 |
| 5,248,102 | A | | 9/1993 | Bohn | |
| 5,382,777 | A | | 1/1995 | Yuhara | |
| 5,443,164 | A | | 8/1995 | Walsh et al. | |
| 5,462,153 | A | | 10/1995 | Friis | |
| 5,628,408 | A | | 5/1997 | Planke et al. | |
| 5,860,503 | A | | 1/1999 | Hanserud et al. | |
| 5,898,169 | A | | 4/1999 | Nordbryhn | |
| 5,988,054 | A | | 11/1999 | Wieglus | |
| D422,314 | S | | 4/2000 | Tandberg | |
| 6,137,900 | A | | 10/2000 | Steidel et al. | |
| D435,596 | S | | 12/2000 | Vaajakallio | |
| 6,196,456 | B1 | | 3/2001 | Taylor | |
| D441,022 | S | | 4/2001 | Vaajakallio | |
| D443,935 | S | | 6/2001 | Unger | |
| 6,626,093 | B1 | | 9/2003 | Van Der Touw et al. | |
| 6,719,146 | B2 | | 4/2004 | Holmen et al. | |
| 7,044,052 | B2 | | 5/2006 | Van Der Touw et al. | |
| D541,870 | S | | 5/2007 | Tandberg | |
| 7,908,031 | B2 | | 3/2011 | Sæther et al. | |
| 2008/0296374 | A1 | * | 12/2008 | Gonen et al. | ................... 235/385 |
| 2010/0088192 | A1 | * | 4/2010 | Bowles et al. | ................... 705/26 |
| 2010/0198671 | A1 | * | 8/2010 | Prabhakar et al. | ......... 705/14.16 |
| 2011/0258128 | A1 | * | 10/2011 | Hambleton et al. | ......... 705/308 |
| 2012/0029980 | A1 | * | 2/2012 | Paz et al. | ..................... 705/14.1 |

* cited by examiner

Primary Examiner — William Rankins

(57) ABSTRACT

Proposed is a computer-implemented method for a recycling company to increase recycling demand, the computer including a processor system having at least one processor and a memory system. The method comprises registering, by the computer, a recycler with a recycling company, wherein the recycler obtains identification. The computer then enters the recycler's identification to begin a transaction for recycling. The type of material to be recycled is entered into the computer. The processor system evaluates a value for the recyclable material and determines the total payment to be paid to the recycler. A portion that is less than or equal to the total payment given to a fund is entered into the computer, and the final payment to be paid to the recycler is computed. The final payment is the total payment less the portion given to the fund. On completion of the above operations, the transaction is logged.

7 Claims, 14 Drawing Sheets

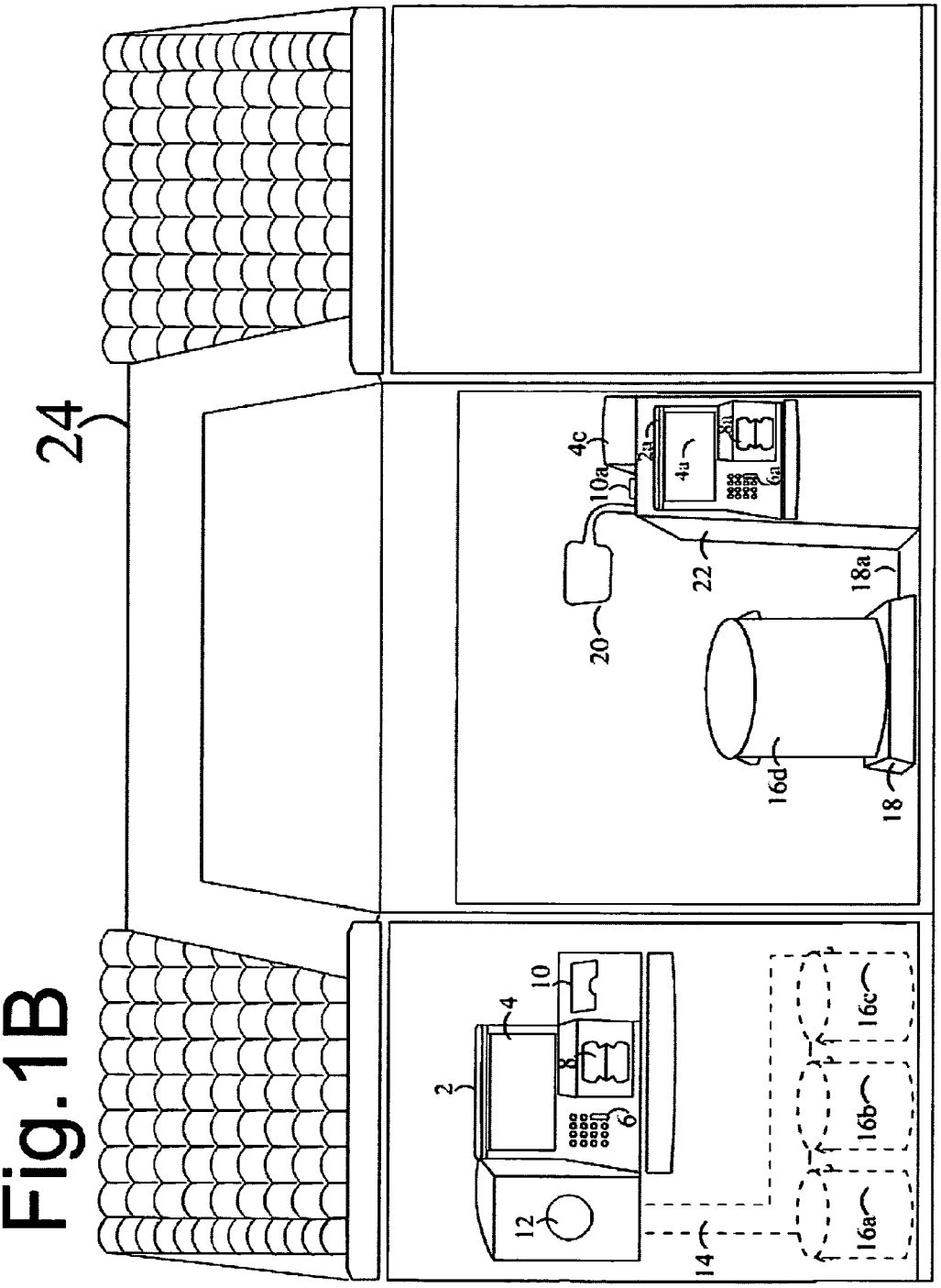

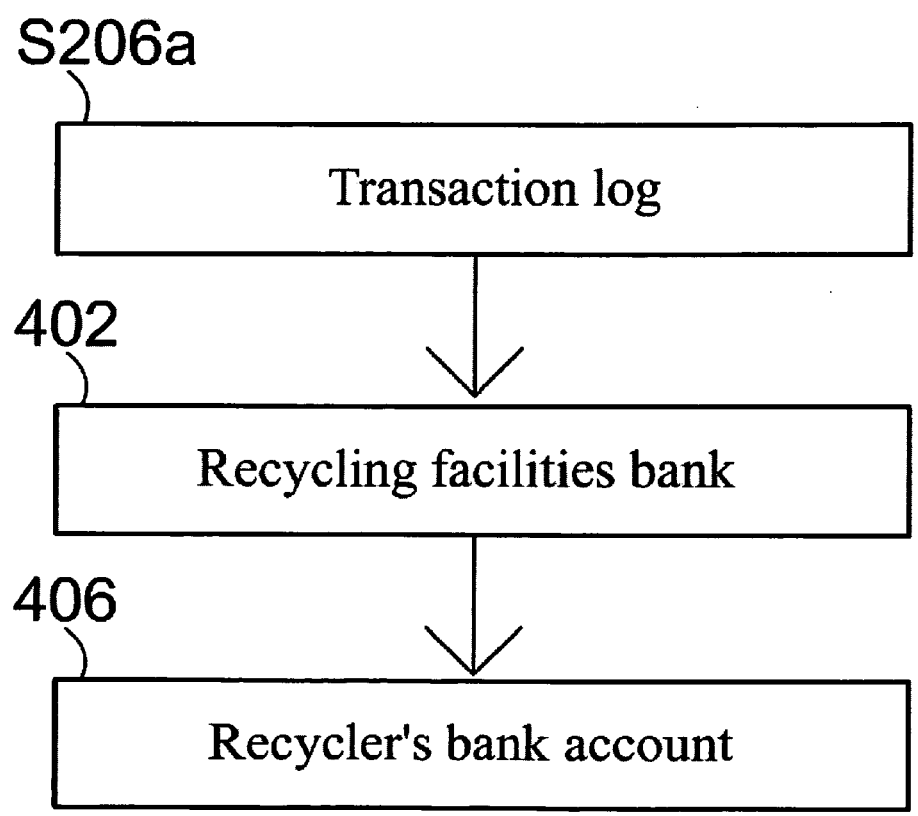

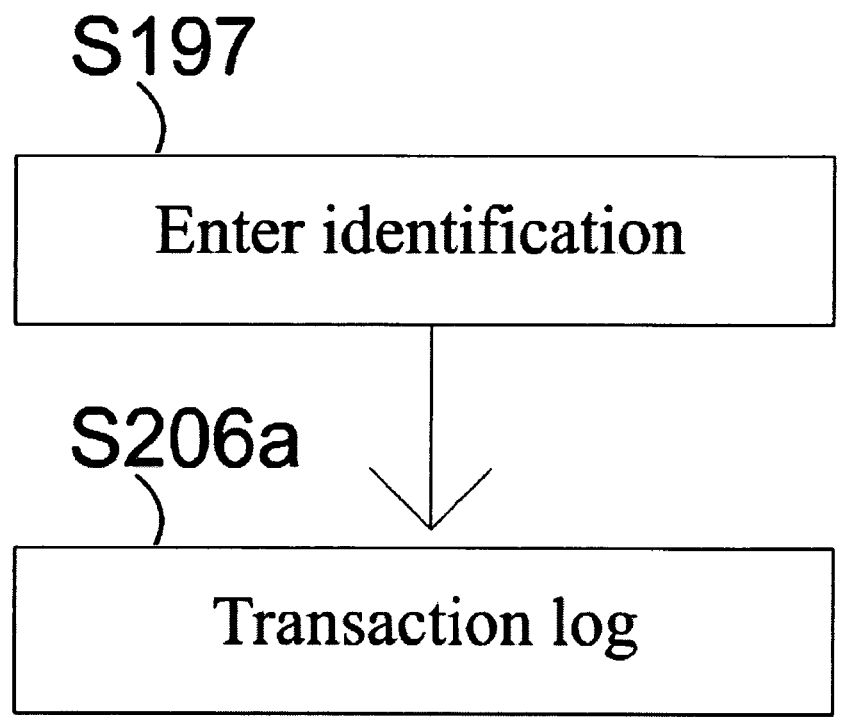

S206a

500

S206a

| Raffle/prizes 1/14/13 - 1/18/13 | | | |
|---|---|---|---|
| Recycler | Id # | Dlp? | Dlp amount |
| 1 | 679-486-876 | Yes | $1.00 |
| 2 | 111-436-002 | Yes | $1.00 |
| 3 | 100-001-943 | Yes | $1.00 |
| 4 | 321-397-611 | No |  |
| 5 | 911-977-000 | Yes | $1.00 |
| 6 | 411-825-290 | Yes | $1.00 |

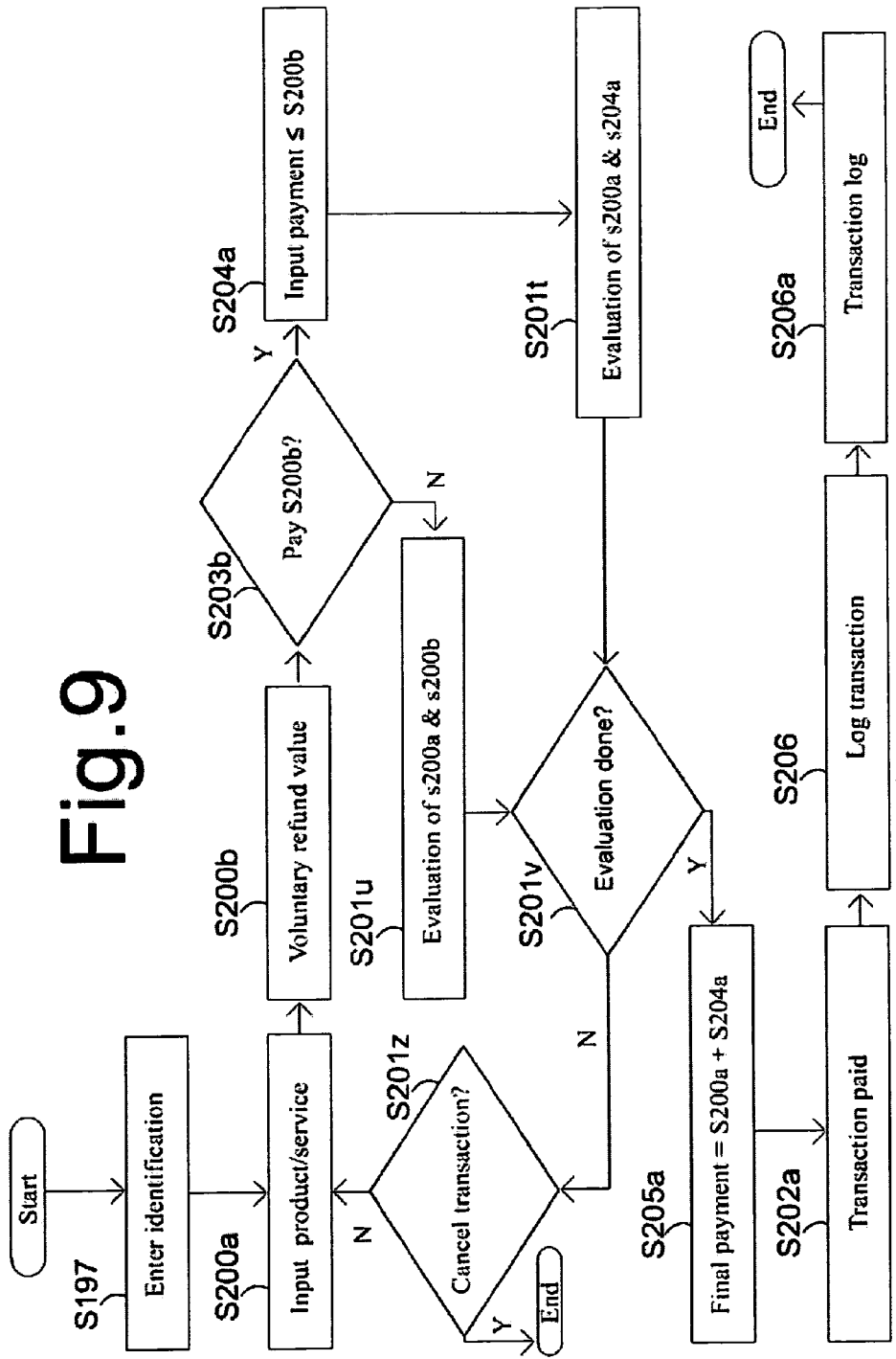

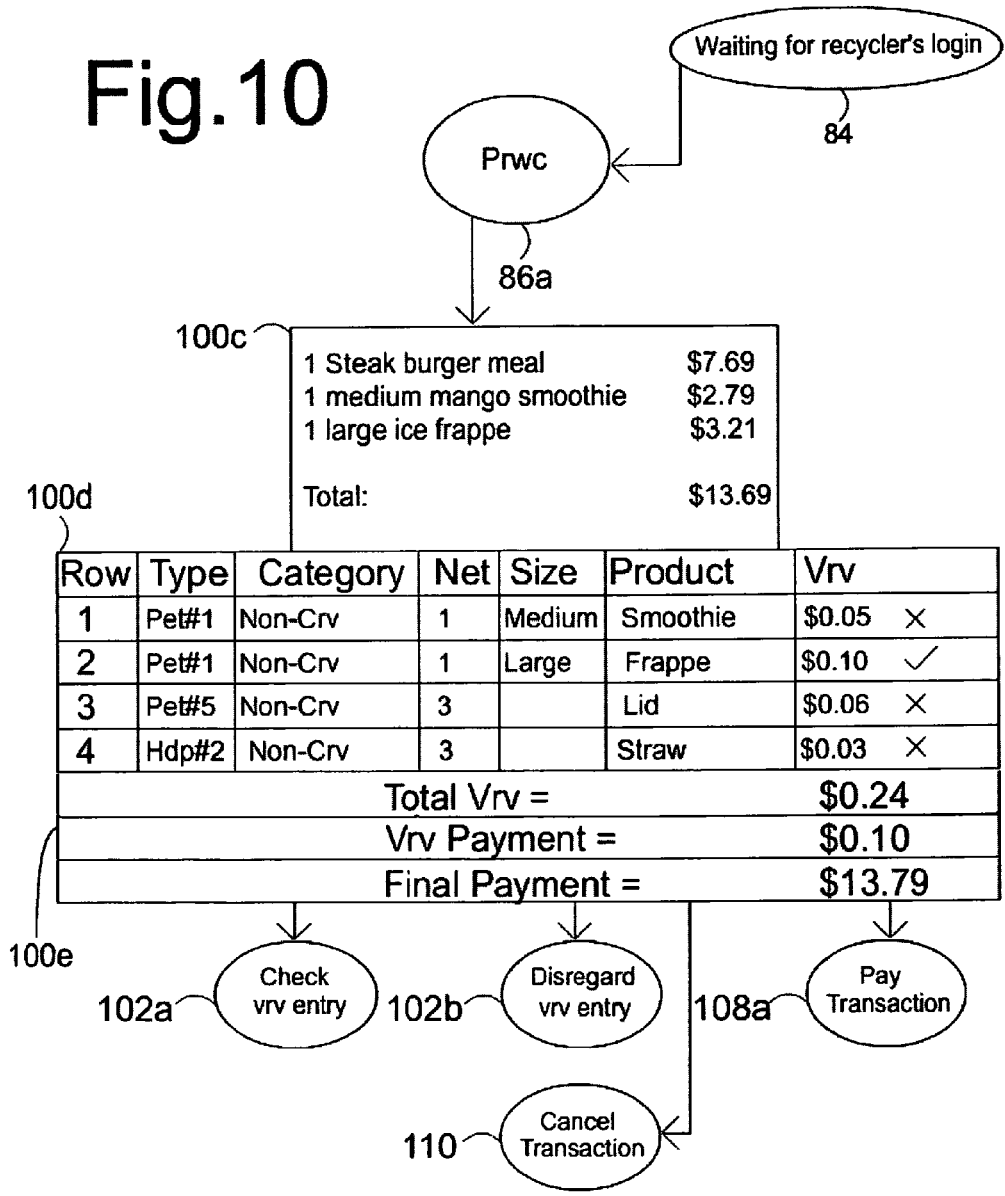

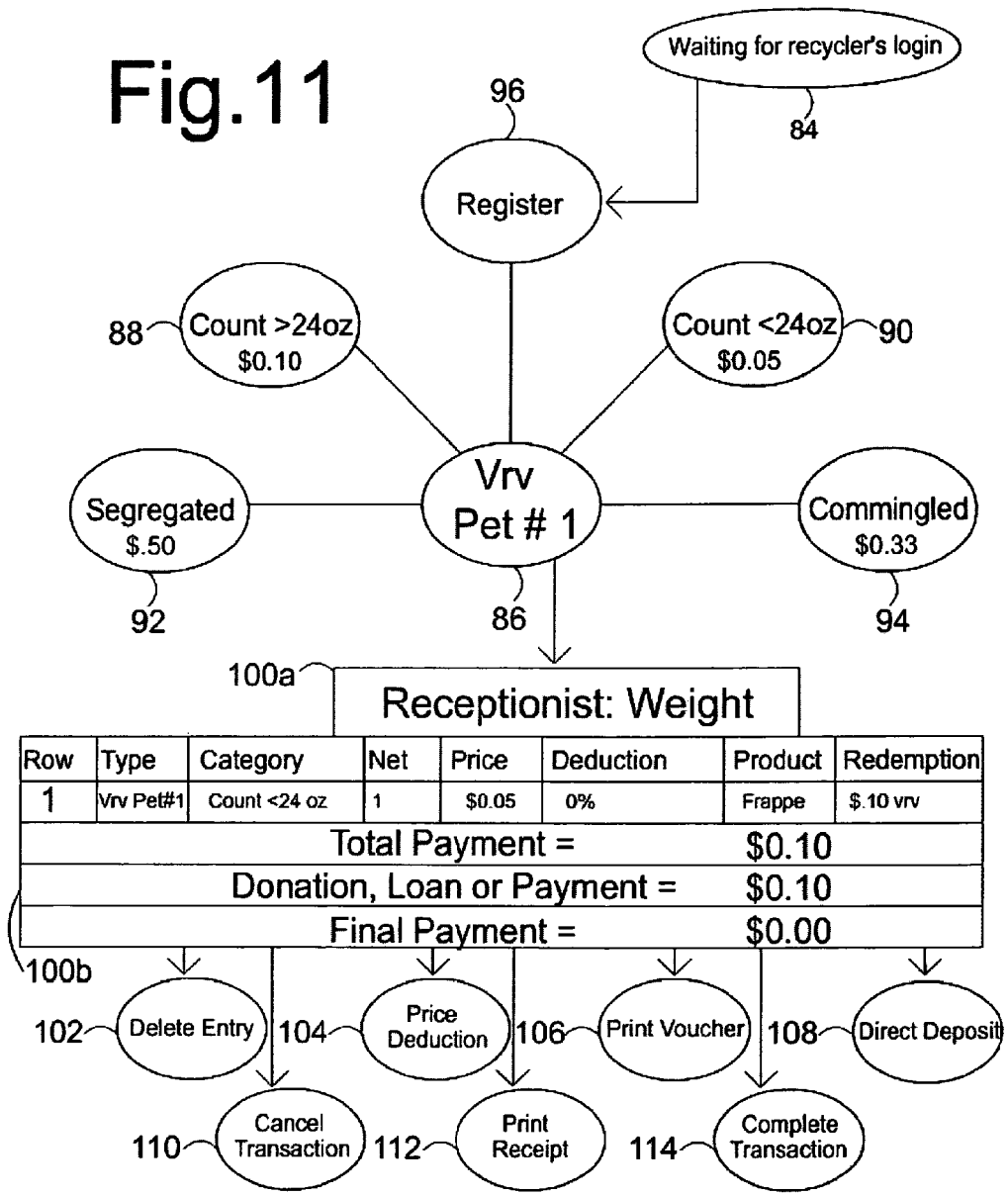

COMPUTER IMPLEMENTED METHOD FOR A RECYCLING COMPANY TO INCREASE RECYCLING DEMAND

FIELD OF INVENTION

This specification relates to the field of financial information and also relates to the field of recycling.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Regardless of the availability of recycling facilities, there is still a large segment of society that does not recycle. The reasons vary, but to name some: inconvenient, time consuming, requires the recycler to be organized, requires the recycler to invest the time required to recycle, requires patience especially when recycling requires waiting in line at a recycling facility. The recycler receives little money unless the recycler has a large amount to recycle, etc.

For example, a workplace may have a bin exclusively for recycling and a bin for trash and people will still throw recyclables in the trash bin. A customer can buy a soda can from a store, finish the soda, and throw the can in a bush. The California refund value (CRV) is a fee paid on purchases of certain recyclable beverage containers in California. The consumer pays the California refund value on the purchase of beverages contained in aluminum, plastic, glass, and bimetal containers and is reimbursed (California redemption value) if the containers are returned to a recycling center.

Recyclers do not register with a recycling company. In fact, recyclers do not have an opportunity to register with a recycling company. Recyclers also do not have the opportunity to look at their recycling records, e.g., via a computer (online). The only record a recycler receives is a receipt, which is usually thrown away. The above method does not create any motivation for people to be more conscious about recycling. Some recycling companies offer free food on certain weekdays and even pay customers a higher rate than the default California redemption value rate. However, paying extra for recyclables is insufficient to attract non-recycling people to recycle.

The trend for recycling companies is to get what they can from the people who actually recycle and to dismiss the rest of the people who do not recycle. Although there are people who go around and collect recyclables from trash cans, bushes, curbsides, and streets, there are still many recyclables that end up in landfills. An effective recycling program is needed to entice the majority of consumers to recycle, and since consumers are the ones purchasing these materials, the consumers are responsible to keep recycled material from ending up in landfills and polluting the environment.

SUMMARY OF THE INVENTION

Proposed is a computer-implemented method for a recycling company to increase recycling demand, the computer including a processor system having at least one processor and a memory system. The method comprises registering by means of a computer and a recycler with a recycling company wherein the recycler obtains identification. The computer then enters the recycler's identification to begin a transaction for recycling. The type of material to be recycled is entered into the computer. The processor system evaluates a value for the recycler's recyclable material, and the computer determines the total payment to be paid to the recycler for the recycling. A portion that is less than or equal to the total payment given to a fund is entered into the computer, and the final payment to be paid to the recycler is computed. The final payment is the total payment less the portion given to the fund. On completion of the above operations, the transaction is logged.

BRIEF DESCRIPTION OF DRAWINGS

In the following drawings, like reference numbers are used to refer to like elements. Although the following figures depict various examples of the invention, the invention is not limited to the examples depicted in the figures.

FIG. 1B illustrates an improved recycling facility for encouraging recycling.

FIG. 7A is a diagram of a recycling company establishing an account with a financial institution.

FIG. 7B is a diagram of a recycling member accessing the recycling transaction.

FIG. 9 is an alternative flowchart illustrating a method for encouraging recycling.

FIG. 10 is an example of a graphical user interface for FIG. 9.

FIG. 11 is an alternative example of a graphical user interface for a recycling receptionist.

DETAILED DESCRIPTION

Although various embodiments of the invention may have been motivated by various deficiencies with prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

To encourage recycling (see FIG. 1A), a recycling company opens a bank account from the recycling company's financial institution (e.g., savings account). Recyclers who have recyclables are offered an opportunity to pay, donate, or loan a portion or all of their earnings from the recyclables into the recycling company's bank account. In return, the bank account holds the funding for raffles and/or prizes, e.g., cash to the recycling participants. Recyclers may be given an opportunity to register with a recycling company, track the recycler's recycling record, view the accumulated funds deposited into the recycling company's bank account, and view the raffle prizes and/or other giveaways, etc.

Figure 1A:
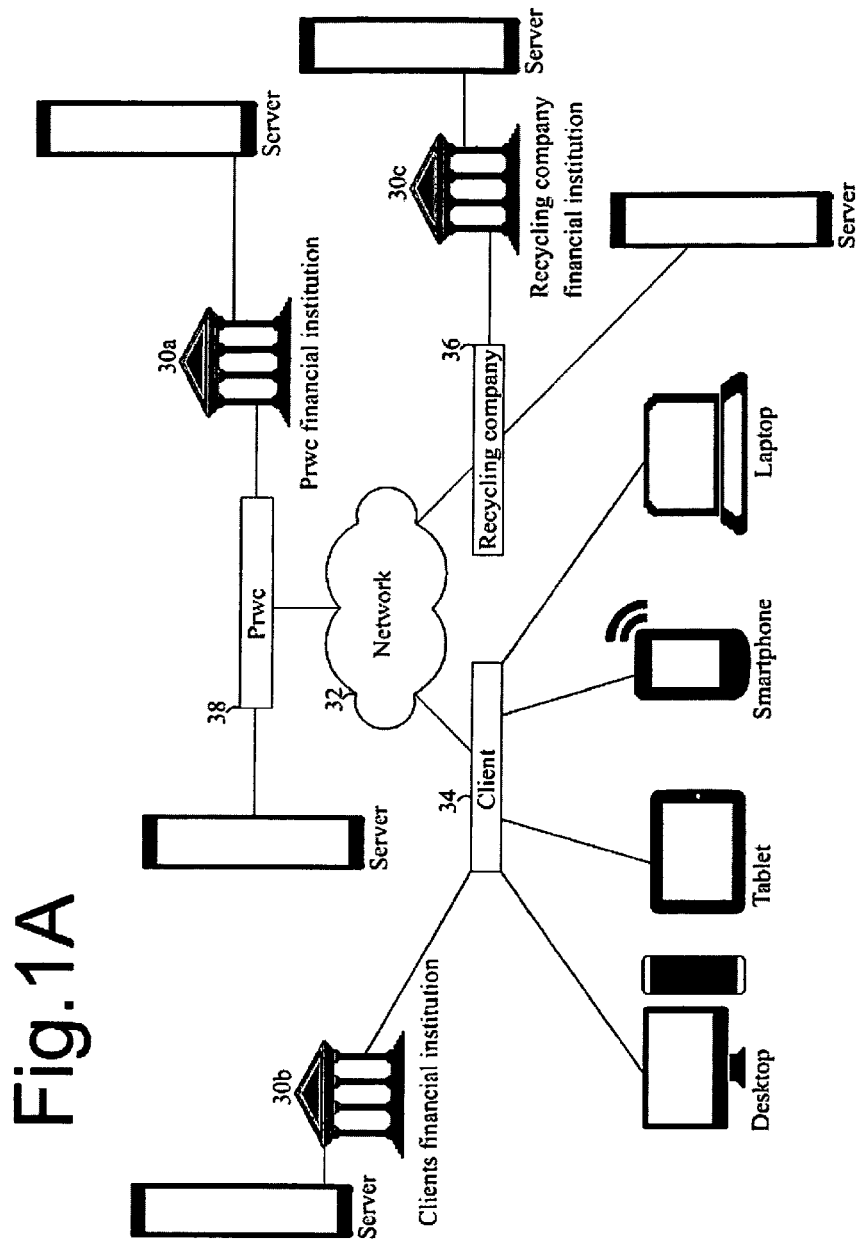
FIG. 1A illustrates a banking and recycling transaction setup.

In FIG. 1A, network 32 communicatively links a potential recycling waste contributor 38 (prwc) that may include a server and/or other computers or machines, the potential recycling waste contributor financial institution 30a that may include a server, client computers 34 that may include desktops, tablets, smart phones, laptops and the like, the client's financial institution 30b that may include a server, a recycling company 36 that may include a server and/or other computers or machines, and the recycling company financial institution 30c that may include a server. Examples of a potential recycling waste contributor are fast-food establishments, grocery stores, restaurants, etc., because each of these uses recyclable material that is not subject to any state fees (e.g., Ca, crv) and, consequently, it is common for such recyclables to end up in landfills (explained in FIG. 9).

The raffle earnings may encourage family and friends to become registered recyclers of the recycling company. Recycling members who do not win can use their donations as tax-deductible expenses (IRS Publication 78) at the end of the year.

For example, a recycler takes 12.3 lb of plastic No. 1 to a recycling facility. Plastic No. 1 is priced at $1.00/lb. Therefore, the recycler is to be paid $12.30. According to prior-art methods, the recycler simply would have been paid $12.30. However, in the current method, the recycler would have had an opportunity to pay, donate, or loan a portion or all of the $12.30 into the recycling company's bank account, which may be used for raffles and/or prizes (e.g., cash) to participating recyclers.

If the recycler chooses to participate in a raffle and pay, donate, or loan $1.00, for example, of the $12.30, then $1.00 would be added to the recycling company's bank account for use in raffles and/or prizes (e.g., cash) to participating recyclers. If the recycling company averages 20 recyclers a day at each of its 700 locations and each recycler donates $1.00 to the recycling company's bank account, the recycling company will receive $14,000 in one day, or $98,000 in one week, for raffles and/or prizes (e.g., cash) to participating recyclers.

The raffles and/or prizes will encourage an increased rate of recyclers. The more donations, loans, and payments from consumer recyclers, the bigger the bank account becomes and the bigger the prizes can become. Larger prizes may be very motivating for consumers who do not recycle, especially if the recycling facility has an expensive prize, such as a new car. The recycling facility can have a broadcast, via smart phones, websites, and/or televisions, about recyclers who have participated and won in an ongoing program. Word of mouth may also be very effective. The idea here is to donate to motivate.

The incentives (tax deductibility, prizes) can cause consumers to think twice before throwing away aluminum cans in the garbage. The incentives may encourage consumers who see a plastic bottle (or other recyclable) on the curb to pick up the plastic bottle. Consumers may be more motivated to become more organized with recycling and even enjoy the recycling process. Prizes may also encourage a large segment of nonrecycling consumers to begin to recycle.

In other words, deposits made into the recycling company's bank account by recyclers fund the raffles and/or prizes, which motivate nonrecyclers to recycle and motivate recyclers to recycle more often.

In another embodiment, deposits of any type (whether in the form of loans, donations, and/or payments) cannot be deposited into the bank account by recyclers by any other means except recyclables. In another embodiment, loans, donations and/or payments cannot exceed the recycling payout made to the recycler. For example, if the total amount owed to the recycler is $20 (if the recycler did not loan, donate, or pay anything), the recycler can only loan, donate, or pay a maximum of $20.

The following description is presented to enable any person skilled in the art to make and use the invention, and is provided in the context of particular applications of the invention and their requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which the present embodiment of the invention is executed incorporates a general-purpose computer or a special-purpose device, such as a hand-held computer.

It should also be understood that the techniques of the present invention might be implemented using a variety of technologies. For example, the methods described herein may be implemented in the software of a computer system or may be implemented in hardware that uses either a combination of microprocessors or other specially designed application-specific integrated circuits, programmable logic devices, or various combinations thereof. In particular, the methods described herein may be implemented by a series of computer-executable instructions residing on a storage medium, such as a hard disk drive or other nontransitory computer-readable medium.

FIG. 1B illustrates a recycling facility 24 with a self-service recycling atm 2 and a recycling receptionist atm workstation 22 (atm means automated teller machine). The self-service recycling atm 2 may include the following: a recycler touchscreen 4, keypad 6, card reader 8, receipt printer 10, conveyor port 12, and conveyor belt 14. The self-service recycling atm 2 gives the recycler a refund for recyclables on a count basis and allows the recycler to donate, loan, or pay a portion or the entire total refund amount that is owed to the recycler, via recycler touchscreen 4, keypad 6, and/or a combination thereof. Count bases means the recycler will be paid based on how many recycles they have (e.g., a 24-oz glass bottle equals $0.10)

The self-service recycling atm 2 may refund the recycler, via a direct deposit into the recycler's bank account or a voucher printed via the receipt printer 10. The process implemented by the self-service recycling atm 2 may include the following. The recycler enters identification, via recycler touchscreen 4, keypad 6, card reader 8, or a combination thereof, to log in for a recycling transaction. Recyclable material is then inserted, via conveyor port 12, and travels on a conveyor belt 14. Then, depending on the type of recyclable material, the recyclable material is placed into bin #1 16a, bin #2 16b, and bin #3 16c. Bin #1 16a may contain aluminum cans, bin #2 16b may contain plastic #1, and bin #3 16c may contain glass.

Once all recyclable material is received from the recycler, the recycler touchscreen 4 displays the total refund amount owed to the recycler and prompt the recycler to donate, loan, or pay a portion or the entire total refund amount that may be entered via recycler touchscreen 4, keypad 6, or a combination thereof. Finally, the final refund amount is displayed, via recycler touchscreen 4, and a voucher is issued by receipt printer 10, or funds are directly deposited into the recycler's bank account.

The recycling receptionist atm workstation 22 may include a receptionist touchscreen 4c, scale 18, connection wire 18a, scale display 20, and recycling atm #2 2a, which may include recycler touchscreen #2 4a, keypad #2 6a, card reader #2 8a, and receipt printer #2 10a. The recycling receptionist atm workstation 22 gives the recycler a refund for recyclables on a weight and count basis (e.g., commingled weight or segregated weight) and allows the recycler to donate, loan, or pay a portion or the entire refund amount that is owed to the recycler. The recycling receptionist atm workstation 22 can refund the recycler via a direct deposit into the recycler's bank account or can print a voucher via the receipt printer #2 10a.

The recycling receptionist atm workstation 22 process proceeds as follows. The recycler enters identification via recycler touchscreen #2 4a, keypad #2 6a, card reader #2 8a, or a combination thereof, to log in for a recycling transaction. Recyclable material (e.g., count, commingled, segregated) is placed in bin #4 16d, weighed on a scale 18, and the weight is displayed on a scale display 20, minus the weight of bin #4 16d. Bin #4 16d may contain exclusively aluminum cans, exclusively plastic #1, or exclusively glass, etc.

Once all recyclable material is received from the recycler, the receptionist touchscreen 4c displays the total refund amount owed to the recycler. If the recycler wants to donate, loan, or pay a portion or the entire refund amount, the receptionist may enter the amount via the receptionist touchscreen 4c. Finally, the final refund amount is displayed via receptionist touchscreen 4c and/or recycler touchscreen #2 4a, and a voucher is issued via receipt printer #2 10a, or funds are directly deposited into the recycler's bank account.

Figure 2:
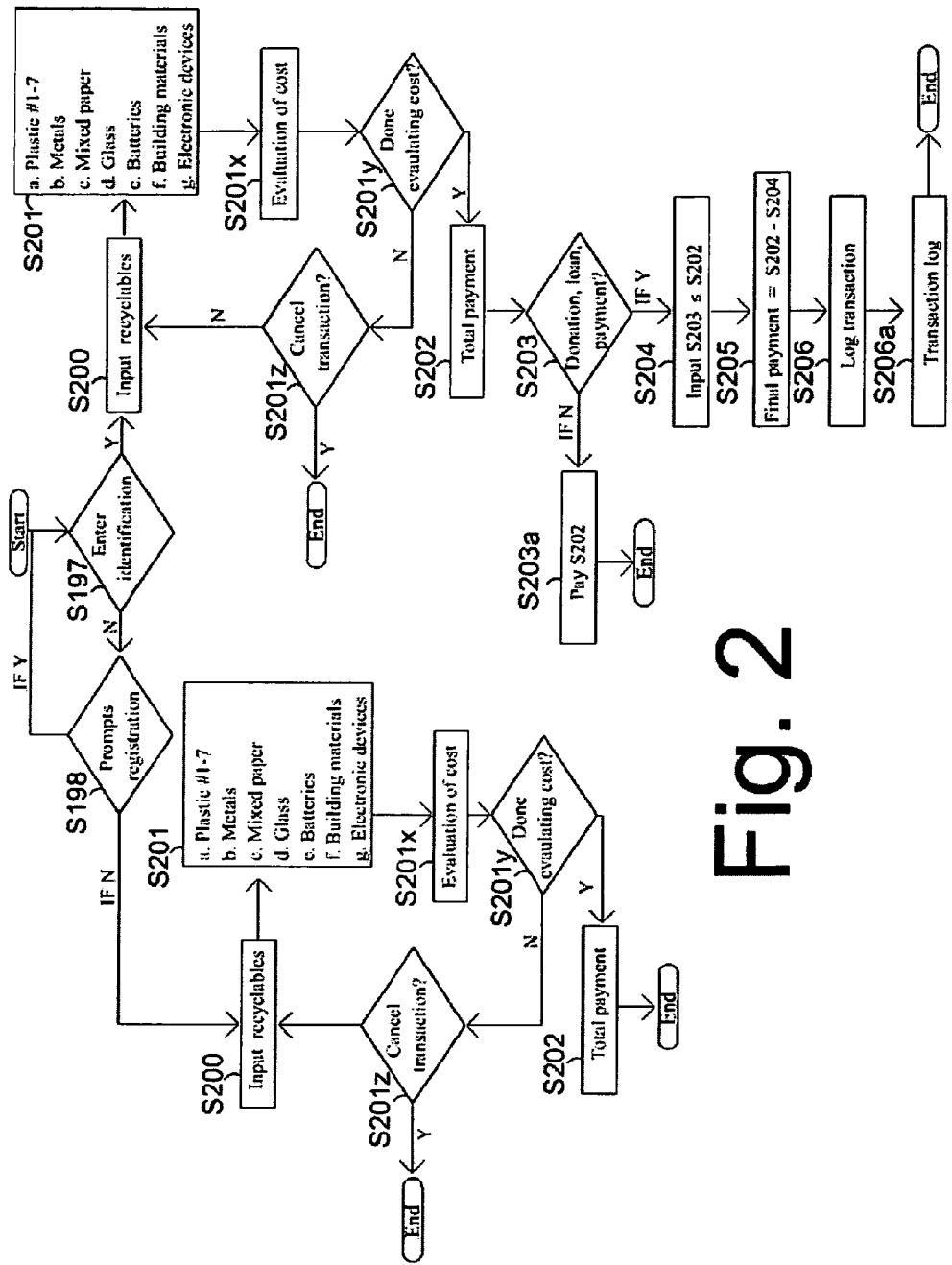
FIG. 2 is a flowchart illustrating a method for encouraging recycling.

In FIG. 2, step S198 may occur online and/or at the recycling facility 24 (FIG. 1B). The remaining steps 197 and 200-206a may occur at the recycling facility 24 (FIG. 1B)

The procedure begins with step S197 requesting identification, such as any one of or any combination of a user name, driver's license number, ID card, cell phone number, email address, street address, debit card, and/or credit card, followed by a password, if desired.

If identification is not entered (following the "no" branch), the procedure prompts the user for registration in step s198. Optionally, that account may belong to one individual and/or optionally may allow for opening a family account (if desired) and may be accessed on line and/or at the recycling facility 24. If registration has been entered (following the "yes" branch), the procedure returns to step s197, where a prompt requests the customer's identification.

If the identification is entered (following the "yes" branch), the procedure proceeds to step S200 for input of valuable recyclable material including, but not limited to, the materials in step s201 (a-g), which may include plastic #1-7 s201a, metals s201b, mixed paper s201c, glass s201d, batteries s201e, building materials s201f, and/or electronic devices s201g. The materials in step s201 (a-g) are priced according to categories that include but that are not limited to segregated weight, commingled weight, and/or by counting each recyclable (e.g., one by one), so that the recyclables can be priced according to the category.

Next, in step s201x, the procedure includes an evaluation of the cost of the recyclable materials in step s201 (a-g), which was entered in step s200. In other words, the values of the recyclable materials are summed and can be price-adjusted or deleted. For example, if one or more items in the recyclable material is contaminated with liquids or unwanted debris, reimbursement for the contaminated item may be reduced. For example, the recycler may be reimbursed for 5 lb of uncontaminated #1 plastic at $1.00/lb. Additionally, the recycler may receive $0.80/lb for 5 lb of contaminated #1 plastic.

The amount of the reimbursement may depend on the degree of contamination. By reducing the amount of the reimbursement, the contaminated #1 plastic is price-adjusted by a deduction of 20%. The price adjustment by deduction may be provided in the recycling facility's policy. The price adjustment may be performed automatically, may be performed based on input from the recycler, and/or may be performed based on input from the receptionist of the recycling center.

In step s201y, the procedure prompts the user to determine whether the cost evaluation is complete. If the cost evaluation is not complete (following the "no" branch) in step s201z, the procedure prompts the user by offering the user an option to cancel the transaction. If input is received from the user indicating cancellation of the transaction (following the "yes" branch), the transaction ends.

If input is received from the user not to cancel the transaction (following the "no" branch), the procedure proceeds to step S200, and then steps s201 (a-g), s201x, and s201y are repeated. Returning to step 201y, if the cost evaluation is complete (following the "yes" branch), the procedures continues to step s202. In step s202, the procedure transmits the total payment to be paid, which may be cash, deposit, or voucher.

In step s203, the procedure requests for either a donation, loan, or payment (noted as dlp) and if giving a donation, loan, or payment is not desirable (following the "no" branch), the procedure proceeds to step s203a, which pays the total payment to the recycler, in step s202, and finally in step s206, a recycling transaction log is created and is logged in a transaction log s206a. In step s203, if a donation, loan, or payment was desirable, in step s204 (following the "yes" branch), the procedure requests a donation, loan, or payment (which was requested in step s203) to be entered as less than or equal to the total payment in step s202. In this embodiment, the donation, loan, or payment in step s203 is not allowed to exceed the amount that would be paid in step s202.

Next, the procedure proceeds to step s205, which sends the final payment, which may be cash, deposit, or voucher. In step s205, the final payment equals the total payment in step s202 minus the amount donated, loaned, or paid by the recycler in step s204. In step s206, a recycling transaction log is created and is logged in a transaction log s206a. If registration is not desirable (following the "no" branch) in step s198, the procedure proceeds to step S200.

Step S200 may include the entry of valuable recyclable material including but not limited to the materials in step s201 (a-g), which may include plastic #1-7 s201a, metals s201b, mixed paper s201c, glass s201d, batteries s201e, building materials s201f, and electronic devices s201g. The materials in step s201 (a-g) are categorized into categories including but not limited to segregated weight (e.g., exclusively California redemption value plastic #1), commingled weight (e.g., California redemption value plastic #1 and non-California redemption value plastic #1) and count, so that the recyclables can be priced by category.

Next, in step s201x, the procedure includes a cost evaluation of the recyclable materials in step s201 (a-g), which was entered in step s200. In other words, the values of the recyclable materials are summed and can be price-adjusted or deleted. For example, if one or more items in the recyclable material is contaminated with liquids or unwanted debris, reimbursement for the contaminated item may be reduced.

For example, the recycler may be reimbursed for 5 lb of noncontaminated #1 plastic at $1.00/lb, while the recycler may receive $0.80/lb for 5 lb of contaminated #1 plastic. The reimbursement amount may depend on the degree of contamination. By reducing the amount of the reimbursement, the contaminated #1 plastic is price-adjusted by deducting 20%. The price adjustment by deduction may be included in the recycling facility's policy. The price adjustment may be performed automatically, may be performed based on input from the recycler, and/or may be performed based on input from the receptionist of the recycling center.

In step s201y, the procedure prompts the user to determine whether the cost evaluation is complete. If the cost evaluation is not complete (following the "no" branch) in step s201z, the procedure prompts the user by offering an option to cancel the transaction. If input is received from the user indicating cancellation of the transaction (following the "yes" branch), the transaction is ends. If input is received from the user not to cancel the transaction (following the "no" branch), the procedure proceeds to step S200, and then steps s201 (a-g), s201x, and s201y are repeated. Returning to step 201y, if the cost evaluation is complete (following the "yes" branch), the procedures continues to step s202. In step s202, the procedure transmits the total payment to be paid, which can be cash, deposit, or voucher, which ends the transaction.

As recyclers donate, pay, and/or loan a portion or the entire amount of money that the recycler is owed, the money is deposited into the recycling company's bank account. There is no upper limit on how large the bank account can become, and there is no upper limit on how much money may be used for raffles and/or prizes. For example, if 100,000 people recycle every day and donate, pay, or loan $1.00 or more from the recyclers recyclables and the raffle and prize giveaway occurs weekly, the recycling company's bank account will have $700,000 for raffle and prize giveaways for several or more recyclers, which encourages recycling.

In an alternative embodiment, the donation, loan, or payment in step s203 may be predetermined. For example, when a recycler registers an account in step s198 and/or when the recycler is accessing the account once the account is registered, the recycler may choose a default amount or percentage of the reimbursement that is to be paid, loaned, and/or donated into the bank account.

Identification in step s197 and registration in step s198 does not have to occur right away. Registered recyclers can be paid in cash or voucher, and/or the money may be deposited into the registered user's bank account via a credit card or debit card.

Figure 3:
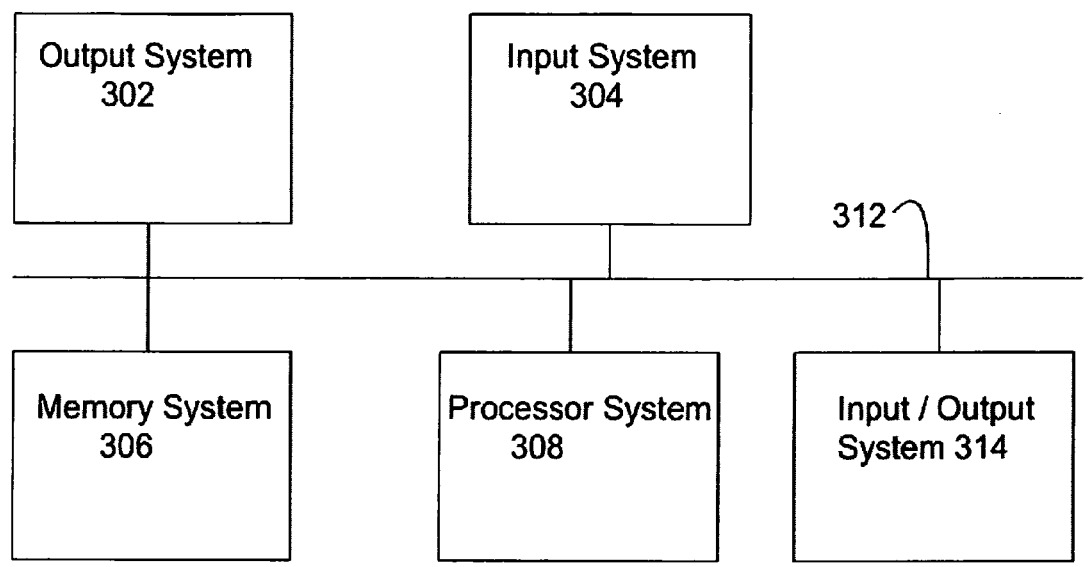
FIG. 3 shows a block diagram of a computer used for implementing the invention.

FIG. 3 shows a block diagram of a computer 300 used for implementing the method in FIG. 2. The computer 300 may include output system 302, input system 304, memory system 306, processor system 308, communications system 312, and input/output device 314. In other embodiments, the computer 300 may include additional components and/or may not include all of the components listed above.

Computer 300 is an example of a computer that may be used for implementing the method in FIGS. 2 and 4 through 12. Output system 302 may include any one of, some of, any combination of, or all of a monitor system, a handheld display system, a printer system, a speaker system, a connection or interface system to a sound system, an interface system to peripheral devices, and/or a connection and/or interface system to a computer system, intranet, and/or internet, for example.

Input system 304 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 306 may include, for example, any one of, some of, any combination of, or all of a long term storage system, such as a hard drive; a short-term storage system, such as random-access memory; a removable storage system, such as a floppy drive or a removable drive; and/or flash memory. Memory system 306 may include one or more machine-readable media that may store a variety of different types of information.

The term machine-readable medium is used to refer to any nontransient medium capable of carrying information that is readable by a machine. One example of a machine-readable medium is a non-transient computer-readable medium. Another example of a machine-readable medium is paper having holes that are detected and that trigger different mechanical, electrical, and/or logic responses. Memory system 306 stores one or more machine instructions for implementing the method in FIGS. 2 and 4 through 12. Memory system 306 may also store a user interface for interaction with the application in FIGS. 2 and 4 through 12.

Processor system 308 may include any one of, some of, any combination of, or all of multiple parallel processors, a single processor, a system of processors having one or more central processors, and/or one or more specialized processors dedicated to specific tasks. Processor 308 implements the machine instructions stored in memory system 306.

Communications system 312 communicatively links output system 302, input system 304, memory system 306, processor system 308, and/or input/output system 314 to each other. Communications system 312 may include any one of, some of, any combination of, or all of electrical cables, fiberoptic cables, and/or means of sending signals through air or water (e.g., wireless communications), or the like. Some examples of means of sending signals through air and/or water include systems for transmitting electromagnetic waves such as infrared and/or radio waves and/or systems for sending sound waves.

Input/output system 314 may include devices that have dual function as input and output devices. For example, input/output system 314 may include one or more touch-sensitive screens, which display an image and therefore are an output device and accept input when the screens are pressed by a finger or stylus, for example. The touch-sensitive screens may be sensitive to heat and/or pressure. One or more of the input/output devices may be sensitive to voltage or current produced by a stylus, for example. Input/output system 314 is optional and may be used in addition to or in place of output system 302 and/or input device 304.

Figure 4:
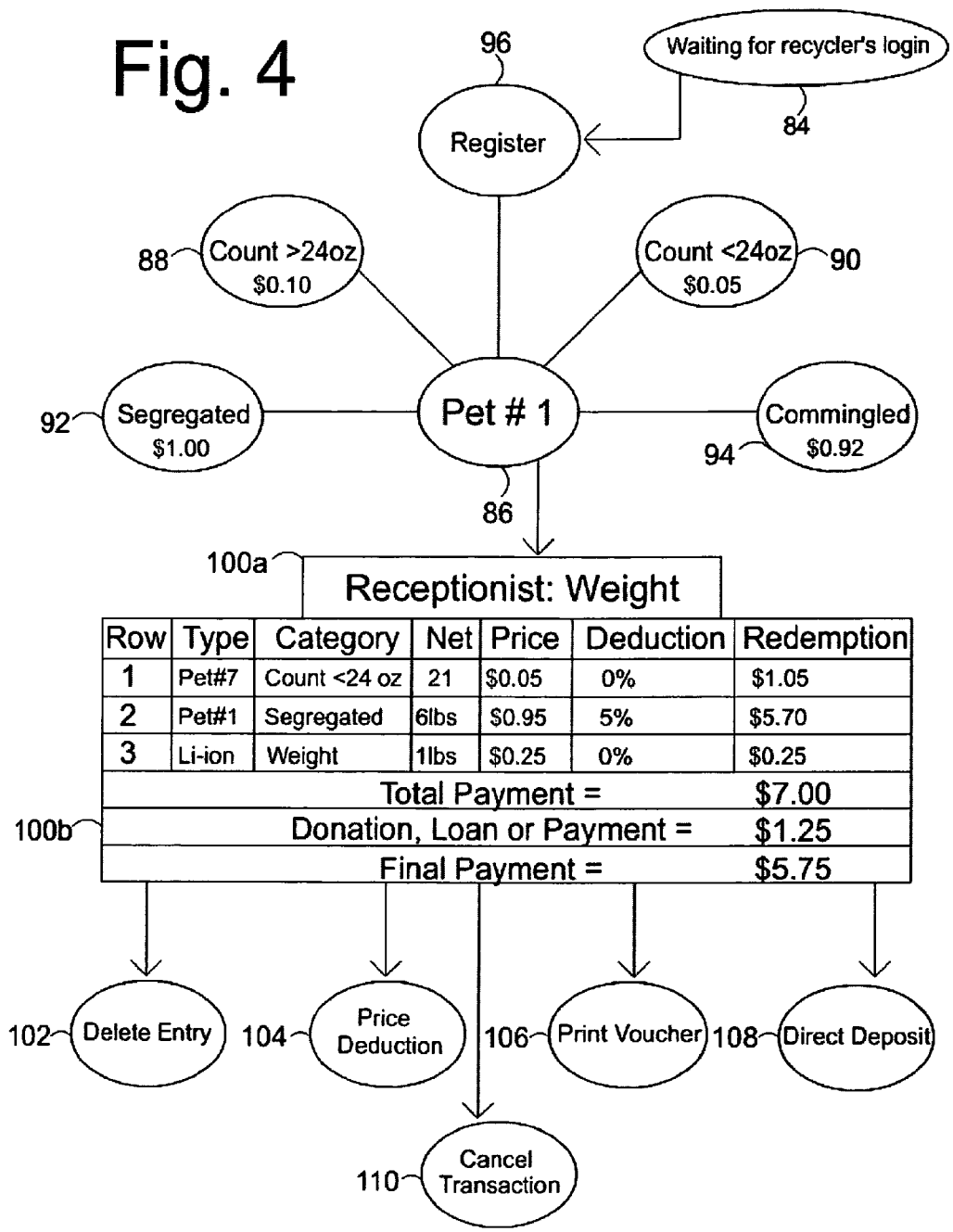
FIG. 4 is an example of a graphical user interface for a recycling receptionist.

FIG. 4 is an example of a graphical user interface for the receptionist touchscreen 4c in FIG. 1B for a recycling receptionist to process a recycler's recyclable material by weight and/or by count.

FIG. 4 may contain a recycler Id window 84, recycling selection menu 86, greater than 24-oz count selection 88 with a price value, less than 24-oz count selection 90 with a price value, segregated weight selection 92 with a price value, commingled weight selection 94 with a price value, registration selection 96, receptionist spreadsheet 100a, donation and/or loan and/or payment selection 100*b*, delete entry selection 102, price deduction selection 104, print voucher selection 106, direct deposit selection 108, and cancel transaction selection 110.

In FIG. 4, recycler Id window 84 displays a recycler's identification once the recycler enters the identification via a log-in selection 98 (log-in selection 98 will be discussed in conjunction with FIG. 5). Registration selection 96 indicates the recycler desires to register. Recycle selection menu 86 includes but is not limited to plastics, metals, mixed paper, glass, batteries, building materials, electronic devices, and displays with one or more options for the recycling receptionist to select, categorizing a recycler's recyclable material.

Greater than 24-oz count selection 88 indicates that the recycler's recyclable material by count is greater than 24 oz and consequently the price value is set to $0.10. Less than 24-oz count selection 90 indicates that recycler's recyclable material by count is less than 24 oz and consequently the price value is set to $0.05.

Segregated weight selection 92 indicates the recycler's recyclable material is segregated (e.g., by weight) and consequently the price value is set to $1.00/lb. Commingled weight selection 94 indicates the recycler's recyclable material is commingled and consequently the price value is set to $0.92/lb.

Receptionist spreadsheet 100*a* is the evaluation of cost process (of step s201*x* in FIG. 2) and may include rows of recyclable material entered in (e.g., row 3) type of recyclable material (e.g., pet#7), price category of recyclable (e.g., segregated), net weight or count of recyclable material (e.g., 6 lb), price deduction of recyclable material (e.g., 5%), redemption amount of recyclable material (e.g., $5.70), and a donation and/or loan and/or payment selection 100*b*. Donation and/or loan and/or payment selection 100*b* indicates the recycler wants to donate and/or loan and/or pay (e.g., $1.25).

Delete entry selection 102 deletes a recycler's recyclable material from a row (e.g., row 2). Price deduction selection 104 deducts a percentage of a recycler's recyclable material from a row (e.g., row 2 at 5% deduction). Print voucher selection 106 issues a voucher to the recycler for the recycler's total payment (e.g., $7.00) or final payment (e.g., $5.75) if the recycler decided to donate and/or loan and/or pay (e.g., $1.25). Print voucher selection 106 may be linked to donation and/or loan and/or payment selection 100*b* just in case the recycling receptionist forgets to ask the recycler if the recycler wants to donate and/or loan and/or pay. For example, if the donation and/or loan and/or payment selection 100*b* has a value of $0.00 (currently $1.25) and the print voucher selection 106 is selected, the procedure may prompt for the donation and/or loan and/or payment selection 100*b* value to be greater than $0.00.

Direct deposit selection 108 deposits the recycler's total payment (e.g., $7.00) or final payment (e.g., $5.75) if the recycler decided to donate and/or loan and/or pay (e.g., $1.25) into the recycler's bank account. Direct deposit selection 108 can be linked to donation and/or loan and/or payment selection 100*b* just in case the recycling receptionist forgets to ask the recycler if the recycler wants to donate and/or loan and/or pay.

For example, if the donation and/or loan and/or payment selection 100*b* has a value of $0.00 (currently $1.25) and the direct deposit selection 108 is selected, the procedure may prompt for the donation and/or loan and/or payment selection 100*b* value to be greater than $0.00. Cancel transaction selection 110 cancels the recycler's transaction, which clears receptionist spreadsheet 100*a*.

Figure 5:
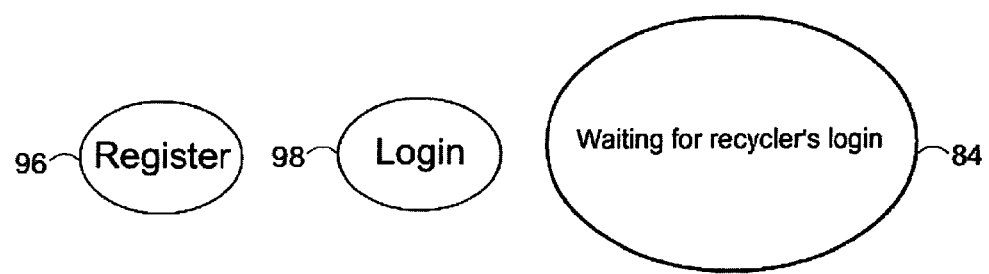
FIG. 5 is an example of a graphical user interface for FIGS. 4, 10, and 11.

FIG. 5 is an example of a graphical user interface for the self-service recycling atm 2 and the recycling receptionist atm workstation 22 in FIG. 1B and/or for a company (e.g., fast-food establishment, explained in FIGS. 9 and 10). In FIG. 5, registration selection 96 registers (of step s198 in FIG. 2) a recycler with the recycling facility 24 (in FIG. 1B). Login selection 98 logs in a recycler for a recycling transaction with the recycling facility 24 (FIG. 1B) and/or for a company (e.g., fast-food establishment, explained in FIGS. 9 and 10). Once a recycler logs in using login selection 98, the recycler's identification is sent to a recycler Id window 84.

Figure 6:
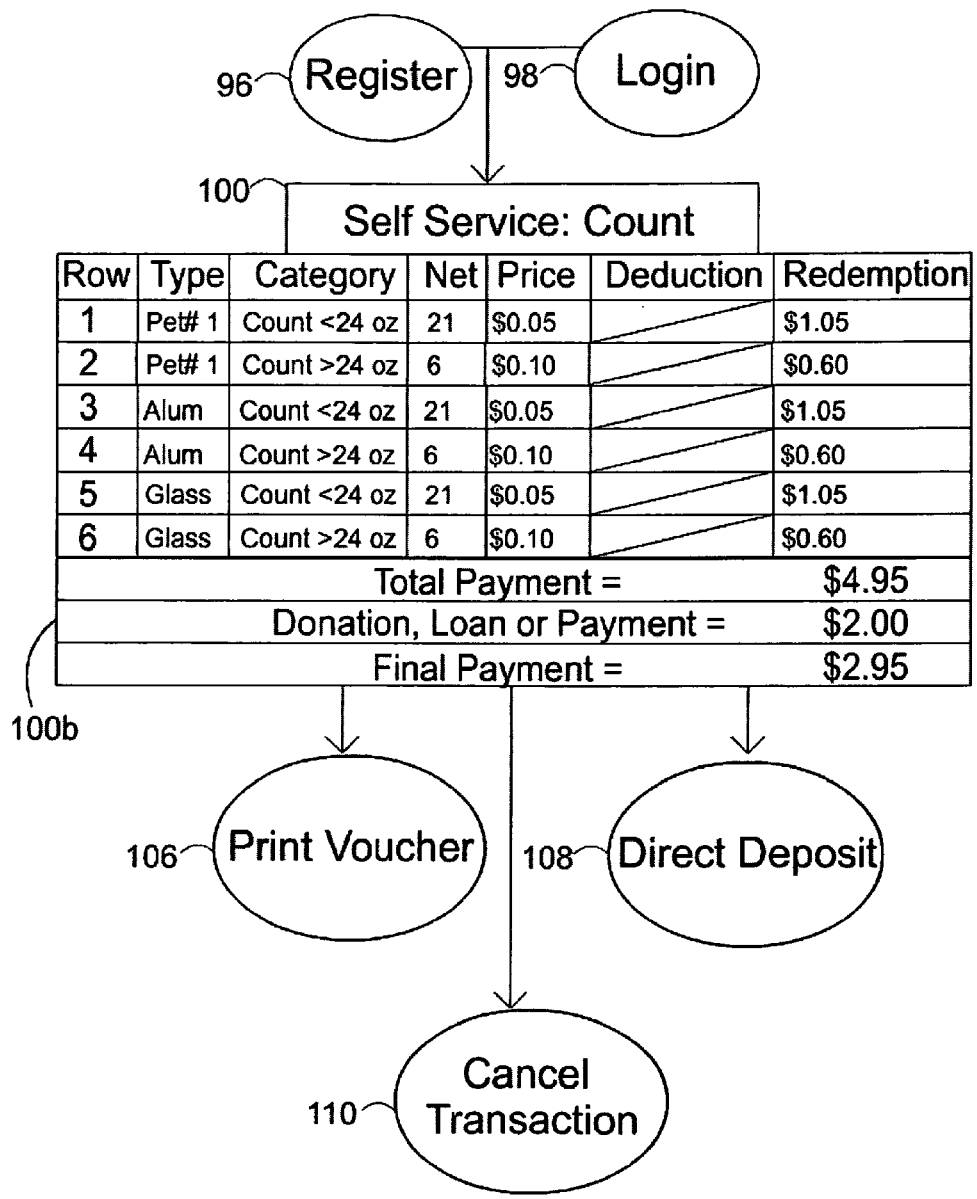
FIG. 6 is an example of a graphical user interface for conducting self-service recycling.

FIG. 6 is an example of a graphical user interface for the self-service recycling atm 2 in FIG. 1B for a recycler to process recyclable material exclusively by count. FIG. 6 may contain registration selection 96, login selection 98, recycler self-service spreadsheet 100, donation and/or loan and/or payment selection 100*b*, print voucher selection 106, direct deposit selection 108, and cancel transaction selection 110.

In FIG. 6, login selection 98 logs in a recycler for a recycling transaction with the recycling facility 24 (in FIG. 1B). Registration selection 96 registers a recycler with the recycling facility 24 (in FIG. 1B). Recycler self-service spreadsheet 100 is the evaluation of a cost process (of step s201*x* in FIG. 2) and may include rows of recyclable material entered in (e.g., row 3), type of recyclable material (e.g., glass), price category of recyclable (e.g., exclusively count), net weight or count of recyclable material (e.g., 21 count), price deduction of recyclable material (e.g., not applicable) redemption amount of recyclable material (e.g., $1.05), and a donation and/or loan and/or payment selection 100*b*. Donation and/or loan and/or payment selection 100*b* indicates the recycler wants to donate and/or loan and/or pay (e.g., $2.00).

Print voucher selection 106 issues to a recycler a voucher for the recycler's total payment (e.g., $4.95) or final payment (e.g., $2.95) if the recycler decided to donate and/or loan and/or pay (e.g., $2.00). Print voucher selection 106 can be linked to donation and/or loan and/or payment selection 100*b* just in case the recycler forgets to donate and/or loan and/or pay. For example, if the donation and/or loan and/or payment selection 100*b* has a value of $0.00 (currently $2.00) and the print voucher selection 106 is selected, the procedure may prompt for the donation and/or loan and/or payment selection 100*b* value to be greater than $0.00.

Direct deposit selection 108 deposits the recycler's total payment (e.g., $4.95) or final payment (e.g., $2.95) if the recycler decided to donate and/or loan and/or pay (e.g., $1.25) into the recycler's bank account. Direct deposit selection 108 can be linked to donation and/or loan and/or payment selection 100*b* just in case the recycler forgets to donate and/or loan and/or payment.

For example, if the donation and/or loan and/or payment selection 100*b* has a value of $0.00 (currently $1.25) and the direct deposit selection 108 is selected, the procedure may prompt for the donation and/or loan and/or payment selection 100*b* value to be greater than $0.00. Cancel transaction selection 110 cancels the recycler's transaction, which clears the recycler self-service spreadsheet 100.

FIG. 7*a* is a diagram of banking interaction between the recycling facility 24 (in FIG. 1B) and a recycler. Transaction log s206*a* (from FIG. 2) may contain the recycler's identifications, bank accounts (which may have been obtained during the registration process), direct deposit requests, donations/loans/payments, total payments, final payments, and/or recycled material type, voluntary refund value payments (which will be discussed further below in conjunction with FIG. 9), etc. FIG. 7*a* shows how the recycling facilities bank 402 may acquire information from transaction log s206a to direct deposit funds into a recycler's bank account 406.

FIG. 7b is a diagram of recycling members having access to transaction logs 206 in order to view the recycler's transaction history and accumulated funds for the raffles and/or prizes. This may occur via a website.

Figures 8A, 8B:
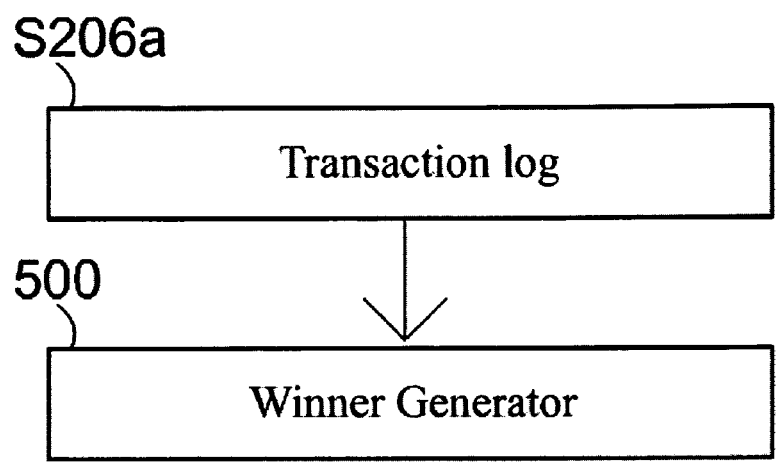
FIG. 8A is a diagram of a recycling company entering recycling transactions within a winner generator.
FIG. 8B is an example of information contained in a recycling transaction.

FIG. 8a is an example of a diagram of the recycling facility 24 (in FIG. 1B) entering the transaction log s206a into a winner generator 500. The winner generator 500 may be a random-number generator (RNG), which is a computational or physical device designed to generate a sequence of numbers or symbols that lack a pattern, i.e., appear random, that are well known throughout the industry. The winner generator may scan transaction log s206a for specific information, retrieving that information and then performing certain computations and/or physical procedures with that information in order to select a participating recycler to be the winner for the raffles and/or prizes. The amount of winners selected may not be limited to just one; winners may win more than once or only once per raffle and/or prizes.

The winner generator 500 may process a winner with a prerequisite of recyclers based on their current location. The winner generator 500 may scan through transaction log s206a and randomly select winners for the raffles and/or prizes.

FIG. 8b is an example of an information transaction log s206a that may be used in order for the winner generator 500 to process winners.

There are six recycling members, each with a unique id number, and a yes/no indication if a recycler gives a donation/loan/payment and the amount. Recycler #4 will be excluded from the raffle and/or prizes, and a recycler can only win once per raffle. If there are to be two winners, then winner generator 500 may select numbers 1, 2, 3, 5, 6, which correspond to each recycler.

FIG. 9 may involve the recycling facility 24 (in FIG. 1B) and a company (e.g., fast food restaurant) that uses recyclable materials for their customers that are not subject to any state fees (e.g., Ca, crv). Recyclables that are not subject to state tax will be denoted nstsf (not subject to states fees), and the companies discarding such recyclables will be noted as potential recycling waste contributors (Prwc).

Examples of potential recycling waste contributors are fast-food restaurants, grocery stores, and full-service restaurants because each uses recyclable material not subject to any state fees (e.g., Ca, crv) and, consequently, it is common for such recyclables to end up in landfills. In California, a not-subject-to-state-fee recyclable material is commonly called non-Ca,crv. In this alternative embodiment, a payment for not-subject-to-state-fee recyclable materials may occur at a potential recycling waste contributor before the recycles are recycled at the recycling facility 24 (in FIG. 1B). The process is called voluntary refund value (Vrv). Customers may have an account with the recycling facility 24 (in FIG. 1B) partnering with the potential recycling waste contributor.

Since not-subject-to-state-fee recyclable materials are not subject to state fees, recycling facilities are not required to pay the fee to recyclers. In California, recycling facilities will take not-subject-to-state-fee recyclable materials if the recycler commingles with California redemption value recycles. In this one-sided scenario, the recycler will be cheated because the recycler owned the recyclable and brought the recyclable to the recycling company based on the understanding that the recycling company would reimburse the recycler (who may not have bothered to bring the recyclable otherwise). A recyclable is a recyclable regardless whether the recyclable is California redemption value or not subject to the state fee. Tons of not-subject-to-state-fee recyclable materials go to landfills annually.

In California, not-subject-to-state-fee recyclable materials include but are not limited to plastics, metals, mixed paper, glass, batteries, building materials, electronic devices, etc. A potential recycling waste contributor, such as a fast-food restaurant, may place a voluntary refund value on not-subject-to-state-fee recyclable materials that the potential recycling waste contributor may use for customers in order to keep such recycles out of a landfill. The voluntary refund value may be priced arbitrarily.

The customers may voluntarily pay a portion or all of the total voluntary refund value, which may go into the recycling facility 24 (in FIG. 1B) bank account. In return, the bank account holds the funding for raffles and/or prizes, e.g., cash to the voluntary refund value participants. Otherwise, the customer can now redeem the not-subject-to-state-fee recyclable materials at the recycling facility 24 (in FIG. 1B) to which the recycling facility 24 (in FIG. 1B) can bill the partnered potential recycling waste contributors. The end result is the recycling facility 24 (in FIG. 1B), the potential recycling waste contributor, and the recycler benefit, and the not-subject-to-state-fee recyclable materials are recycled.

The process in FIG. 9 may start at a potential recycling waste contributor that uses not-subject-to-state-fee recyclable materials for customers and may finish at the potential recycling waste contributor partnered recycling facility 24 (in FIG. 1B). The procedure begins with step s197, requesting identification. Next, in step s200a, the procedure requests entry of products and/or services containing not-subject-to-state-fee recyclable materials. In step s200b, the procedure transmits a voluntary refund value for the not-subject-to-state-fee recyclable materials.

Next, in step s203b, the procedure requests a payment on the voluntary refund value s200b, and if the payment was desirable (following the "yes" branch), in step s204a the procedure requests payment to be entered as less than or equal to the voluntary refund value s200b because the payment may not exceed the voluntary refund value s200b.

Next, in step s201t, the procedure conducts an evaluation. In other words, the cost of the product and/or service s200a and the payment for the voluntary refund value s200b that was entered in step s204a are summed. Furthermore, the payment for the voluntary refund value s200b that was entered in step s204a may be adjusted.

In step s201v, the procedure prompts the user to determine whether the evaluation is complete. If the evaluation is not complete (following the "no" branch) in step s201z, the procedure prompts the user by offering an option to cancel the transaction. If input is received from the user indicating cancellation (following the "yes" branch), the transaction ends.

If input is received from the user not to cancel the transaction (following the "no" branch), the procedure proceeds to step S200a, and then steps s200b, s203b, s204a, and s201t are repeated. Returning to step 201v, if the evaluation is complete (following the "yes" branch), the procedure proceeds to step s205a, which transmits a final payment equal to step s200a, plus step s204a. When the transaction is paid in step s202a, in step s206 a log of the recycling transaction is created and is logged in a transaction log s206a.

If the payment on the voluntary refund value s200b is not desirable in step s203b (following the "no" branch), the procedure goes to step s201u for an evaluation just in case a customer abruptly desires a payment on the voluntary refund value s200b, which directs the procedure to follow the "yes" branch from step s203b to step s204a, as described above.

In other words, the cost of the product and/or service s200a and the voluntary refund value s200b are summed, and the voluntary refund value s200b can remain unwanted (marked with an x, FIG. 10) or changed as to be wanted (checked, FIG. 10).

In step s201v, the procedure prompts the user to determine whether the evaluation is complete. If the evaluation is not complete (following the "no" branch) in step s201z, the procedure prompts the user by offering the user an option to cancel the transaction. If input is received from the user indicating cancellation (following the "yes" branch), the transaction ends.

If input is received from the user not to cancel the transaction (following the "no" branch), the procedure proceeds to step S200a, and then steps s200b, s203b, and s201u, are repeated. Returning to step 201v, if the evaluation is complete (following the "yes" branch), the procedure proceeds to step s205a, which transmits a final payment equal to step s200a, plus step s204a. When the transaction is paid in step s202a, in step s206 a log of the recycling transaction is created and is logged in a transaction log s206a.

In an alternative embodiment, the payment in step s204a may be predetermined. For example, when a recycler registers an account in step s198 (FIG. 2) and/or when the recycler is accessing the account once the account is registered, the recycler may choose a default amount or percentage of the voluntary refund value that is to be paid into the recycling facility 24 (FIG. 1B) bank account. Also, identification in step s197 need not occur immediately. FIG. 10 is an example of a graphical user interface for FIG. 9 and the potential recycling waste contributor (e.g., fast food). In FIG. 10, recycler Id window 84 displays a recycler's identification once the recycler enters it in via login selection 98 in FIG. 5. The potential recycling waste contributor (prwc) system 86a contains the potential recycling waste contributor's products, while the potential recycling waste contributor spreadsheet 100c shows the chosen products and cost. The voluntary refund value spreadsheet 100d shows the not-subject-to-state-fee recyclable materials that may be contained in the products in the potential recycling waste contributor spreadsheet 100c, as well as the products that are wanted (checked) and not wanted (marked with an x), both of which can be changed accordingly.

The voluntary refund value spreadsheet 100d also shows a total voluntary refund value (total vrv) of all not-subject-to-state-fee recyclable materials that may be contained in the products in the potential recycling waste contributor spreadsheet 100c (e.g., $0.24) and a final payment (e.g., $13.79) owed for the items in the potential recycling waste contributor spreadsheet 100c, plus the checked items in the voluntary refund value spreadsheet 100d. The voluntary refund value payment selection 100e initiates the entry of a customer's voluntary refund value payment amount (e.g., $0.10 and a maximum of $0.24).

The check voluntary refund value entry selection 102a changes any item in the voluntary refund value spreadsheet 100d (e.g., item in row 1) to be changed as wanted (checked) from the item's current unwanted (marked with an x) status. The disregard voluntary refund value entry selection 102b changes any item in the voluntary refund value spreadsheet 100d (e.g., item in row 2) to be changed as unwanted (marked with an x) from item's current wanted (checked) status. The pay transaction selection 108a submits the transaction to be paid, and the cancel transaction selection 110 clears the potential recycling waste contributor spreadsheet 100c and the voluntary refund value spreadsheet 100d.

The log transaction s206a may also contain a recycler's voluntary refund value payment (s204a in FIG. 9). Therefore, when the recycler goes to the recycling facility 24 (FIG. 1B) to recycle the not-subject-to-state-fee recyclable materials (that the recycler may have acquired as described above in FIG. 9), the process described in FIG. 2 may now take place to complete the transaction. Accordingly, step s197 in FIG. 2 may not be needed because a recycler may be identified when the recycler's voluntary refund value recyclable material, the recycler may have acquired as described above (FIG. 9) is entered in step s200 of FIG. 2. Not-subject-to-state-fee recyclable materials may be identified by barcodes, tracking numbers, qr codes, and the like.

Figure 12:
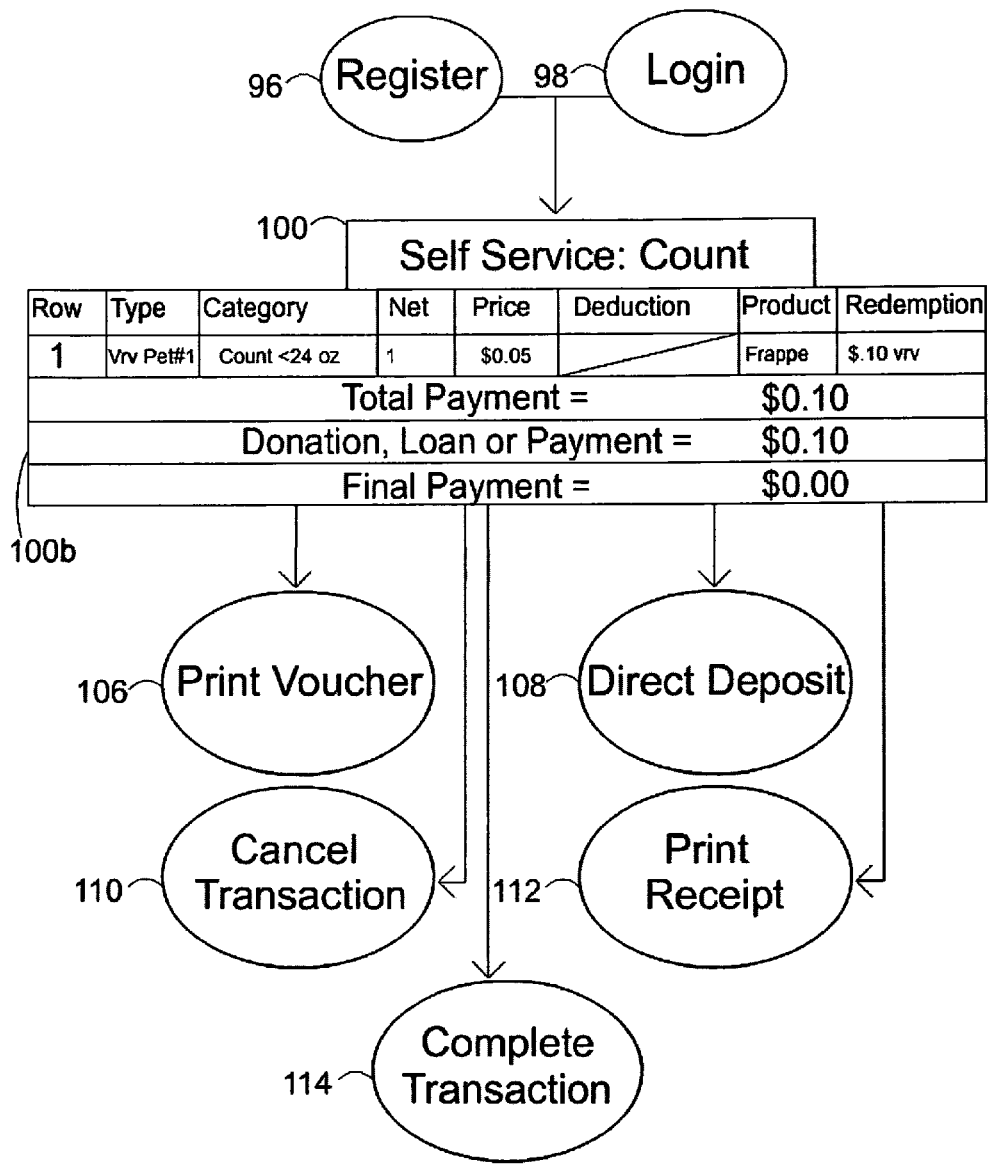
FIG. 12 is an alternative example of a graphical user interface for a recycler conducting self-service recycling.

FIG. 11 illustrates an example of a graphical user interface for a recycling receptionist to process the final transaction from FIG. 10, while FIG. 12 illustrates an example of a graphical user interface for a recycler to process the final transaction from FIG. 10.

FIG. 11 corresponds to the transaction that took place in FIG. 10 and that is carried out by the process described in FIG. 2. The recycle selection menu 86 has now been set to voluntary refund value pet #1, a not-subject-to-state-fee recyclable material. The segregated weight selection 92 has now been set to $0.50/lb, and the commingled weight selection 94 has now been set to $0.33/lb. The not-subject-to-state-fee recyclable material, which was a large pet #1 ice frappe, has been placed in the receptionist spreadsheet 100a in row 1. As seen in the receptionist spreadsheet 100a, a total payment of $0.10 is owed to the recycler, and the final payment is $0.00.

However, although the donation and/or loan and/or payment selection 100b has been set to $0.10, the donation and/or loan and/or payment selection 100b can be changed (as stated), which will change the final payment accordingly. In this example, the final payment is $0.00, and the transaction can be completed with the print receipt selection 112 or the complete transaction selection 114. If the final payment has a value greater than zero, then the print voucher selection 106 or the direct deposit selection 108 may complete the transaction. The delete entry selection 102 and price deduction selection 104 may be selected as well. For example, selecting the delete entry selection 102 may delete the item in row 1 in the receptionist spreadsheet 100a, and selecting the price deduction selection 104 may reduce the redemption value of the item in row 1 in the receptionist spreadsheet 100a to less than $0.10.

FIG. 12 corresponds to the transaction that took place in FIG. 10 and that is carried out by the process described in FIG. 2. The not-subject-to-state-fee recyclable material, which was a large pet #1 ice frappe from a fast-food restaurant, has been placed in the recycler self-service spreadsheet 100. As seen in the recycler self-service spreadsheet 100, a total payment of $0.10 is owed to the recycler, and the final payment is $0.00. However, although the donation and/or loan and/or payment selection 100b has been set to $0.10, the donation and/or loan and/or payment selection 100b can be changed (as stated), which will change the final payment accordingly. In this example, the final payment is $0.00, and the transaction can be completed with the print receipt selection 112 or the complete transaction selection 114. If the final payment has a value greater than zero, then the print voucher selection 106 or the direct deposit selection 108 may complete the transaction.

ALTERNATIVES AND EXTENSIONS

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A computer-implemented method for a recycling company to increase recycling demand, the computer including a processor system having at least one processor and a memory system, the computer-implemented method comprising:
   (a) if not already registered, registering, by the computer, a recycler with a recycling company, wherein the recycler obtains an identification;
   b) entering, by the computer, the recycler's identification to begin a transaction for recycling;
   (c) entering, into the computer, the recycler's recyclable material;
   (d) evaluating, by the processor system, a value for the recycler's recyclable material and determining by the computer a total payment to be paid to the recycler for the recycler's recyclable material;
   (e) entering, into the computer, a portion that is less than or equal to the total payment given to a fund;
   (f) computing a final payment to be paid to the recycler, which is the total payment less the portion given to the fund;
   (g) logging the transaction; and
   adjusting by the processor system an amount of a reimbursement based on the recyclable material being mixed with unwanted material if said recyclable material is mixed with unwanted material.

2. The method according to claim 1, further comprising the step of presenting a link for deleting recyclable material from a transaction.

3. The method according to claim 1, wherein the recycler has access to the recycling transaction that was logged.

4. A computer-implemented method for a recycling company to increase recycling demand, the computer including a processor system having at least one processor and a memory system, the computer-implemented method comprising:
   (a) if not already registered, registering, by the computer, a recycler with a recycling company, wherein the recycler obtains an identification;
   b) entering, by the computer, the recycler's identification to begin a transaction for recycling;
   (c) entering, into the computer, the recycler's recyclable material;
   (d) evaluating, by the processor system, a value for the recycler's recyclable material and determining by the computer a total payment to be paid to the recycler for the recycler's recyclable material;
   (e) entering, into the computer, a portion that is less than or equal to the total payment given to a fund;
   (f) computing a final payment to be paid to the recycler, which is the total payment less the portion given to the fund;
   (g) logging the transaction, and receiving input from the recycler for a default method of computing the portion, wherein receiving of the input from the recycler for the default method of computing the portion occurs as a part of the registration process.

5. A computer-implemented method for a recycling company to increase recycling demand, the computer including a processor system having at least one processor and a memory system, the computer-implemented method comprising:
   (a) if not already registered, registering, by the computer, a recycler with a recycling company, wherein the recycler obtains an identification;
   b) entering, by the computer, the recycler's identification to begin a transaction for recycling;
   (c) entering, into the computer, the recycler's recyclable material;
   (d) evaluating, by the processor system, a value for the recycler's recyclable material and determining by the computer a total payment to be paid to the recycler for the recycler's recyclable material;
   (e) entering, into the computer, a portion that is less than or equal to the total payment given to a fund;
   (f) computing a final payment to be paid to the recycler, which is the total payment less the portion given to the fund;
   (g) logging the transaction, wherein the recycling transaction is processed within a winner generator so that the recycler may be selected as a winner and the winner generator may be a random-number generator (RNG), which is a computational or physical device designed to generate a sequence of numbers or symbols that lack a pattern.

6. The method according to claim 5, wherein the recycler may win more than once.

7. The method according to claim 5, wherein the winner generator transmits a winner based on a prerequisite of the recycler's giving a specific portion amount.

* * * * *